(12) United States Patent
Iwasaki

(10) Patent No.: US 8,220,273 B2
(45) Date of Patent: Jul. 17, 2012

(54) COOLING STRUCTURE FOR GAS TURBINE COMBUSTOR

(75) Inventor: Hidekazu Iwasaki, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 12/895,248

(22) Filed: Sep. 30, 2010

(65) Prior Publication Data
US 2011/0016869 A1    Jan. 27, 2011

Related U.S. Application Data

(63) Continuation of application No. PCT/JP2008/004008, filed on Dec. 26, 2008.

(30) Foreign Application Priority Data

Mar. 31, 2008   (JP) .................................. 2008-092813

(51) Int. Cl.
   *F02C 1/00*   (2006.01)
(52) U.S. Cl. ........................................................ 60/752
(58) Field of Classification Search ............ 60/752–760; 428/593
   See application file for complete search history.

(56) References Cited

U.S. PATENT DOCUMENTS

| | | | | |
|---|---|---|---|---|
| 1,848,375 A | * | 3/1932 | Muir | ............ 165/153 |
| 3,946,892 A | * | 3/1976 | Rigal et al. | ........ 220/62.18 |
| 4,384,020 A | * | 5/1983 | Beggs et al. | ............ 428/138 |
| 4,642,993 A | * | 2/1987 | Sweet | ............ 60/752 |
| 5,080,284 A | * | 1/1992 | Cires | ............ 239/127.3 |
| 5,577,555 A | | 11/1996 | Hisajima et al. | |
| 5,655,361 A | * | 8/1997 | Kishi | ............ 60/266 |
| 6,399,217 B1 | | 6/2002 | Lee et al. | |
| 6,612,248 B2 | * | 9/2003 | Becker | ............ 110/336 |
| 6,769,875 B2 | | 8/2004 | Tiemann | |
| 7,104,067 B2 | | 9/2006 | Bunker | |
| 7,373,778 B2 | | 5/2008 | Bunker et al. | |
| 2003/0049125 A1 | | 3/2003 | Bolms et al. | |
| 2003/0049127 A1 | | 3/2003 | Tiemann | |
| 2004/0079082 A1 | | 4/2004 | Bunker | |

(Continued)

FOREIGN PATENT DOCUMENTS

CN   1418284 A   5/2003

(Continued)

OTHER PUBLICATIONS

International Preliminary Report on Patentability Nov. 9, 2010.

(Continued)

*Primary Examiner* — William H Rodriguez
*Assistant Examiner* — Phutthiwat Wongwian
(74) *Attorney, Agent, or Firm* — Sughrue Mion, PLLC

(57) ABSTRACT

A gas turbine combustor having an improved cooling structure effective to efficiently suppress a possible occurrence of buckling in the combustion liner while exhibiting a convection cooling effect to the combustion liner, the gas turbine combustor includes a combustion liner having a combustion chamber defined therein and an outer peripheral surface forming a path of a compressed air, and a heat transfer enhancement structure provided on the outer peripheral surface of the combustion liner. The heat transfer enhancement structure referred to above is of a honeycomb construction defined by ribs protruding outwardly from the outer surface of the combustion liner. The honeycomb construction may be of a geometry in which hexagonal shapes, rhombic shapes, parallelogrammic shapes, bent rectangular shapes or triangular shapes are deployed next to each other.

10 Claims, 8 Drawing Sheets

U.S. PATENT DOCUMENTS

2006/0042255 A1 3/2006 Bunker et al.
2006/0053798 A1* 3/2006 Hadder .................... 60/772

FOREIGN PATENT DOCUMENTS

| | | | |
|---|---|---|---|
| CN | 1606655 | A | 4/2005 |
| CN | 1740640 | A | 8/2005 |
| JP | 06-307788 | A | 11/1994 |
| JP | 06307788 | A | 11/1994 |
| JP | 10-082527 | A | 3/1998 |
| JP | 2000-088252 | A | 3/2000 |
| JP | 2000088252 | A | 3/2000 |
| JP | 2001-214702 | A | 8/2001 |
| JP | 2003-528246 | A | 9/2003 |
| JP | 2003528246 | A | 9/2003 |
| JP | 2003-534481 | A | 11/2003 |
| JP | 200353441 | A | 11/2003 |
| JP | 2004-144469 | A | 5/2004 |
| JP | 2006-063984 | A | 3/2006 |
| JP | 2006063984 | A | 3/2006 |
| JP | 2007-132640 | A | 5/2007 |

OTHER PUBLICATIONS

Chinese Office Action Appln. No. 200880128268.6 Aug. 12, 2011.
Chinese Office Action Application No. 200880128268.6; Feb. 17, 2012.

* cited by examiner

US 8,220,273 B2

COOLING STRUCTURE FOR GAS TURBINE COMBUSTOR

CROSS REFERENCE TO THE RELATED APPLICATION

This application is a continuation application, under 35 U.S.C. §111(a), of international application No. PCT/JP2008/004008, filed Dec. 26, 2008, which claims priority to Japanese patent application No. 2008-092813, filed Mar. 31, 2008, the disclosure of which is incorporated by reference in its entirety into this application.

BACKGROUND OF THE INVENTION

1. Field of the Invention

The present invention generally relates to a gas turbine combustor and, more particularly, to an improved cooling structure used in the gas turbine combustor for cooling a combustion liner with a compressed air flowing outside such combustion liner.

2. Description of the Related Art

In the gas turbine engine, in order to improve the turbine efficiency, a tendency is found in recent years to set the temperature of the combustion gas at a turbine inlet to be high. However, increase of the flame temperature tends to result in an increase of the emission of NOx and, therefore, to reduce the emission of NOx, it is necessary to suppress the increase of the flame temperature by increasing the amount of air used for combustion. Accordingly, in order to reduce the air which does not participate in combustion (cooling air), it is desired to increase the convection cooling performance of the combustion liner. The cooling structure for the combustion liner has been well known in the art, in which as shown in FIG. 11, chevron shaped heat transfer enhancement ribs 52 are formed on an outer peripheral surface 51 of the combustion liner 50 in a longitudinal direction L along the direction of flow of a compressed air A from a combustor and also in a transverse direction R along the circumference of the combustion liner 2. (See, for example, the Patent Document 1 listed below.)

The cooling structure has also been well known in the art, in which as shown in FIG. 12, heat transfer enhancement ribs 53 extending straight towards the transverse direction R are formed on the outer peripheral surface 51 of the combustion liner 50 so as to be spaced a predetermined distance from each other. Those known cooling structures are similarly so designed and so configured that, the compressed air A then flowing can collide against the heat transfer enhancement ribs 52 or 53 to form turbulent flows that are utilized to effectively cool the outer surface 51 of the combustion liner 50.

[Patent Document 1] JP Laid-open Patent Publication No. 2006-63984

SUMMARY OF THE INVENTION

It has, however, been found that in the case of any one of the heat transfer enhancement ribs 52 and 53 hereinabove discussed, an increase of the convection cooling effect can be expected to a certain extent, but the convection cooling effect of the combustion liner 50 is not sufficient because as shown by the double dotted chain lines 55, 56 and 57 shown respectively in FIGS. 11 and 12, continuous areas where no heat transfer enhancement ribs such as those identified by 52 and 53 exists are left extending in an axial direction and also in a circumferential direction.

Also, the combustion liner is generally placed under a condition, in which a large thermal stress is generated as a result of the difference in temperature between the outside and inside of the combustion liner and, in addition, a pressure load acts from the outside to the inside at all times during the operation due to the difference in pressure between the inside and outside of the combustion liner. For this reason, in the combustion liner 50 of the structure shown in and described with reference to any one of FIGS. 11 and 12, the rigidity of a portion of the combustion liner 50, where the continuous areas 55 and 56 or 57 with no heat transfer enhancement rib exists, is so low that once the difference in temperature between the inside and the outside thereof becomes large due to an increase of the combustion temperature, buckling is apt to occur in that portion of the combustion liner 50, making it difficult to secure a desired or required lifetime of the combustion liner 50.

In view of the foregoing, the present invention has been devised to provide a gas turbine combustor having an improved cooling structure effective to efficiently suppress a possible occurrence of buckling in the combustion liner while exhibiting a convection cooling effect to the combustion liner.

In order to accomplish the foregoing object, the present invention provides a gas turbine combustor which includes a combustion liner having a combustion chamber defined therein and an outer peripheral surface forming a path of a compressed air; and a heat transfer enhancement structure provided on the outer peripheral surface of the combustion liner and having a honeycomb construction defined by ribs protruding outwardly from the outer peripheral surface of the combustion liner. It is to be noted that the term "honeycomb construction" referred to above and hereinafter in this specification is intended to mean a structure in which a number of polygonal cells, each having an angled corner or vertex in a number equal to or greater than three, are deployed with each side commonly sharing with the next adjoining side.

According to the gas turbine combustor of the present invention, since the heat transfer enhancement structure made up of the ribs has a honeycomb construction, the ribs of the heat transfer enhancement structure exist on the outer peripheral surface of the combustion liner continuously in a direction circumferentially and axially thereof. Since as a result thereof, the combustion liner can be cooled substantially uniformly in its entirety, the convection cooling effect increases. Also, the heat transfer enhancement structure of the honeycomb construction functions as a stress member operable to reinforce the combustion liner 2 in its entirety to thereby allow that portion of the combustion liner, where the heat transfer enhancement structure is formed, to have a substantially uniform rigidity. Accordingly, the combustion liner is effectively prevented from buckling, which would otherwise occur under the influence of a thermal stress of the combustion liner, brought about by the difference in temperature between the inside and outside of the combustion liner, and a pressure load brought about by the difference in pressure prevalent between the inside and outside of the combustion liner.

In one embodiment of the present invention, the honeycomb construction may be of a geometry having an array of hexagonal shapes arranged next to each other. No matter how each of the hexagonal shapes is oriented in any direction, at least one of the six sides crosses the direction of flow of compressed air at an angle not larger than 90°. At a portion of the heat transfer enhancement structure of the honeycomb construction, which crosses the direction of flow of the compressed air at an angle not larger than 90°, swirling flows of the compressed air generate when the latter collide against that portion. By the action of those swirling flows so formed, the compressed air is stirred enough to reduce or disrupt the thermal boundary layer of the compressed air to facilitate convection flow of the compressed air. Accordingly, a portion of the compressed air, which is relatively low in temperature and is flowing at a location distant from the outer peripheral surface of the combustion liner, is drawn towards the outer peripheral surface of the combustion liner, wherefore heat transfer takes place efficiently from the combustion liner to the compressed air to thereby increase a convection cooling effect on and of the combustion liner.

Preferably, where the hexagonal honeycomb construction is employed in the combustion liner, at least two vertexes opposed each other, forming one vertex pair out of three vertex pairs of the hexagonal shape, may be opposed to each other in a direction along a direction of flow of the compressed air. Since this arrangement results in that each of the ribs forming at least four sides of the hexagonal shape crosses the direction of flow of the compressed air at a crossing angle of not larger than 90°, causing those sides to generate the swirling flows is effective to increase the convection cooling effect. Also, since the two ribs positioned on an upstream side with respect to the direction of flow of the compressed air causes the swirling flows to generate so as flow in a direction diverting from the imaginary axis assumed as extending across the two vertexes referred to previously and the resultant swirling flows effectively cools them when colliding against the two ribs opposed to the direction of flow of the compressed air, the convection cooling effect further increases.

In one embodiment of the present invention, the parallel ribs, which form two sides opposed to each other and extend parallel to the direction of flow of the compressed air, may protrude a larger distance than that of any one of slanted ribs forming the remaining sides. By so selecting, the swirling flows of the compressed air generated by the slanted ribs on the upstream side as hereinabove described flow in contact with respective inner faces of the ribs, which have a large surface area of heat transmission due to the large amount of projection thereof, and, therefore, cooling of the ribs can be accelerated to further increase the convection cooling effect of the combustion liner. In addition, due to the ribs having the large amount of projection and, hence, the large height, the rigidity of the combustion liner can be increased.

In one embodiment of the present invention, the honeycomb construction may be of a geometry having an array of rhombic shapes arranged next to each other. Where the honeycomb construction of the quadrilateral shape is employed, at least two vertexes opposed each other, forming one vertex pair out of two vertex pairs of the rhombic shape, are preferably opposed to each other in a direction along a direction of flow of the compressed air. By so doing, each of the ribs forming respectively the four sides of the rhombic shape crosses the direction of flow of the compressed air at a crossing angle not larger than 90° and, therefore, the convection cooling effect can be increased by causing those four sides to generate the swirling flows.

In one embodiment of the present invention, the honeycomb construction may be of a geometry having an array of, for example, triangle shapes arranged next to each other. In this case, no matter how the triangular shapes be oriented in any direction, at least one of the three sides of each of the triangular shapes crosses the direction of flow of the compressed air at a crossing angle of not larger than 90° and, therefore, the convection cooling effect can be increased when the swirling flows are generated by at least one of those three sides.

Preferably, the honeycomb construction may be of a geometry having an array of parallelogrammic shapes arranged next to each other, each shape having two sides opposed to each other and extending parallel to a direction of flow of the compressed air. Alternatively, the honeycomb construction may be of a geometry having an array of bent rectangular shapes arranged next to each other, each shape having two sides opposed to each other and extending parallel to a direction of flow of the compressed air and the remaining two opposed sides so bent as to protrude towards an upstream side or a downstream side of the direction of flow of the compressed air.

In a still further embodiment of the present invention, a stand-alone rib may be provided at a center of each of cells defining the honeycomb construction and separate from each of sides of the honeycomb construction. The use of the stand-alone ribs at the respective centers of the cells is advantageous in that since the stand-alone ribs are separate from and independent of the ribs, increase of the heat transfer surface area can be brought about by the stand-alone ribs at the respective centers of the cells of the honeycomb construction to such an extent as to result in generation of turbulent flows downstream of the stand-alone ribs to thereby stir the compressed air. Therefore, cooling at the centers of the cells can be facilitated and, hence, the uniform convection cooling effect can be obtained over the entire outer peripheral surface of the combustion liner. It is to be noted that the shape of each of the stand-alone ribs may be a cylindrical shape or a polygonal column shape, but the present invention may not necessarily be limited thereto.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Hereinafter, embodiments of the present invention will be described in detail with reference to the accompanying drawings.

Figure 1:
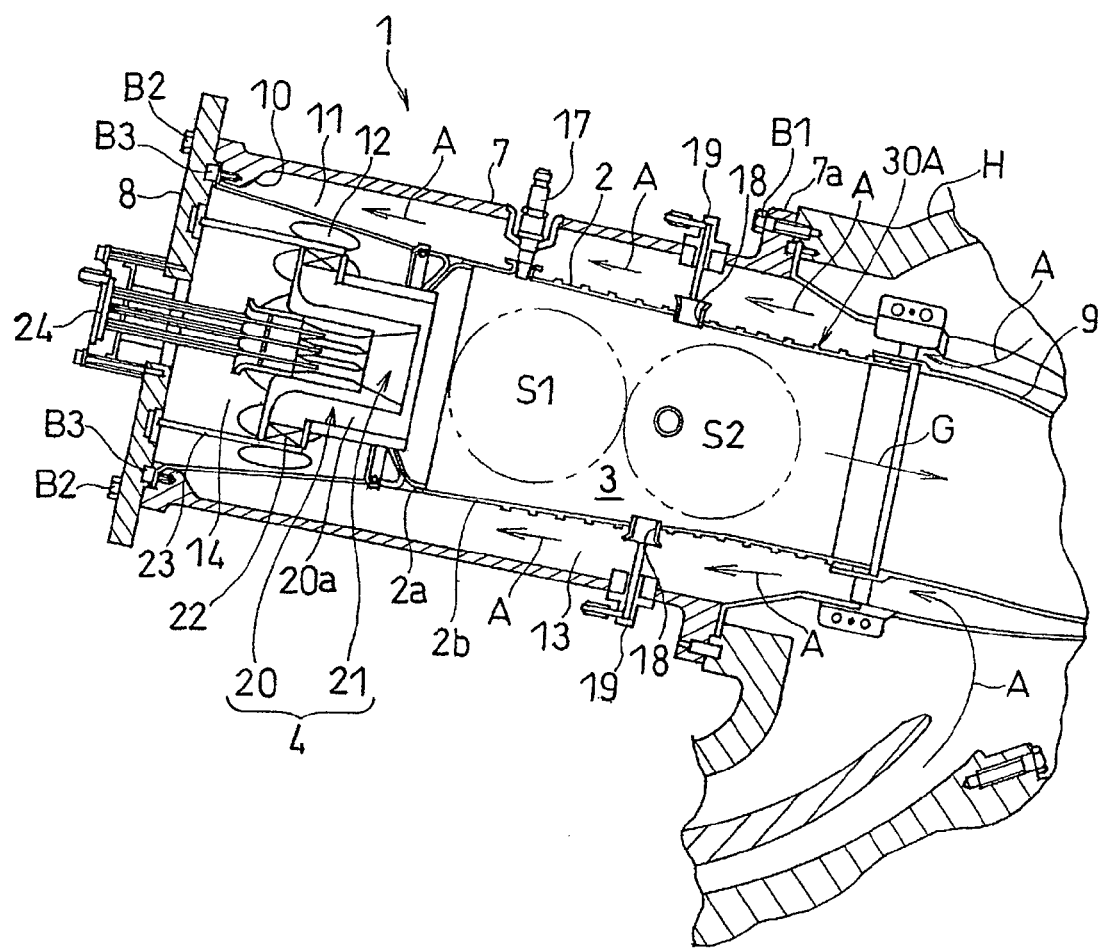
FIG. 1 is a fragmentary longitudinal sectional view showing a gas turbine combustor according to a first embodiment of the present invention.

FIG. 1 illustrates a gas turbine combustor 1 according to a first embodiment of the present invention in a fragmentary longitudinal sectional representation. The gas turbine engine has three principal components including a compressor, a gas turbine combustor 1 and a turbine and is so designed that a compressed air A supplied from the compressor can be mixed with fuel within the gas turbine combustor 1, in which combustion of the mixture of the compressed air with the fuel takes place to generate a combustion gas G of high temperature and high pressure. The combustion gas G is in turn supplied to the turbine to provide a drive power. In this gas turbine engine the compressor is driven by the turbine. Such a load as, for example, an aircraft rotor or a power generator is driven by an output of the gas turbine engine.

The gas turbine combustor 1 is generally employed in a plural number in one gas turbine engine and those gas turbine combustors 1 are disposed around the rotational axis of the engine. Each of the gas turbine combustor 1 is made up of a combustion liner 2, defining a combustion chamber 3 therein, and a burner unit 4 mounted on a top wall 2a of the combustion liner 2 for injecting an air/fuel mixture into the combustion chamber 3. The combustion liner 2 and the burner unit 4 are accommodated within a cylindrical casing 7 that forms an outer liner of the gas turbine combustor 1 in coaxial relation to each other. The casing 7 has a downstream portion provided with a flange 7a protruding radially outwardly, through which the casing 7 is connected with a main housing H of an engine main body including the compressor and the turbine, by means of bolts B1. An upstream portion of the casing 7 has an end plate 8 fixed thereto by means of bolts B2.

The casing 7 is also provided with an annular inner flange 10 protruding radially inwardly in an inner peripheral wall of the casing 7 adjacent the upstream end thereof, and a support tube 11, fixed to a top portion of the combustion liner 2 so as to extend cylindrically therefrom, is connected with that inner flange 10 by means of bolts B3, so that an upper end portion of the combustion liner 2 is fitted to the casing 7. A downstream end portion of the combustion liner 2 is supported by an inlet of a transit duct 9 that defines a combustion gas introducing passage leading to the turbine. An air path 13 for introducing the compressed air A from the compressor towards the top portion (upstream end portion) of the combustion liner 2 is formed between the casing 7 and the combustion liner 2, and the compressed air A flowing through this air path 13 is introduced into an air introducing space 14, defined cooperatively by the support tube 11 and the end plate 8, through a plurality of air introducing ports 12, which are defined in a peripheral wall of the support tube 11 and arranged in a direction circumferentially of the support tube 11.

A cylindrical peripheral wall 2b of the combustion liner 2 has one or a plurality of ignition plugs 17 mounted thereon. The ignition plug 17 is fixed to the casing 7 after having passed through the casing 7 and then through the cylindrical peripheral wall 2b so as to ignite the air-fuel mixture injected from the burner unit 4 to form a first combustion zone S1 in an upstream portion of the combustion chamber 3. Also, a plurality of air introducing ports 18, each defined by a corresponding short pipe extending through the peripheral wall 2b of the combustion liner 2, are defined in a portion of the peripheral wall 2b on a downstream side of the ignition plug 17. On the other hand, a supplemental burner 19 is fitted to the casing 7 at a location confronting the respective air introducing port 18 in the casing 7, with a tip thereof positioned inside each of the air introducing ports 18. The supplemental burner 19 is utilized to form a second combustion zone S2 at a location downstream of the first combustion zone S1 within the combustion chamber 3, where combustion gases of a high temperature are developed when the fuel is injected into the combustion liner 2 through the air introducing ports 18.

The burner unit 4 includes a main burner 20 for injecting a pre-mix gas, containing a swirling component, and a pilot burner 21 disposed inside the main burner 20. The main burner 20 includes an pre-mix gas passage 20a defined therein having an upstream end formed with an air-fuel introducing port, which is provided with a swirler 22 in the form of stationary vanes disposed in the air-fuel introducing port of the pre-mix gas passage 20a. The swirler 22 confronts a fuel injecting port at a tip of a first fuel supply unit 23 made up of a plurality of pipes. An air for combustion, which is introduced into the pre-mix gas passage 20a through the swirler 22, and fuel supplied from the first fuel supply unit 23 are given a swirling motion, and the pre-mix gas, which are well mixed in the pre-mix gas passage 20a owing to this swirling motion is injected into the combustion chamber 3 to allow lean combustion to occur. Also, fuel from a second fuel supply unit 24 is supplied to the pilot burner 21 so that a diffusive combustion may take place within the combustion chamber 3.

Figure 2:
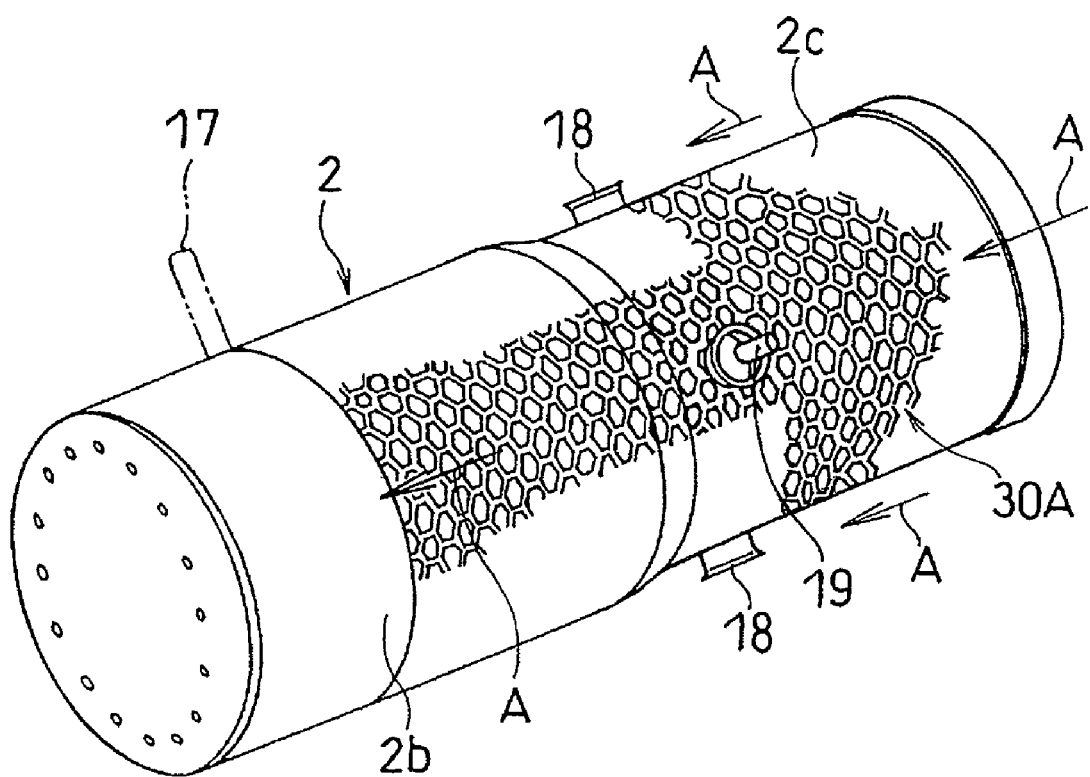
FIG. 2 is a schematic perspective view showing a combustion liner employed in the gas turbine combustor shown in FIG. 1.

FIG. 2 illustrates a schematic perspective view of the combustion liner 2 referred to above. This combustion liner 2 is provided with an improved cooling structure including a heat transfer enhancement structure 30A, which represents a honeycomb construction when such heat transfer enhancement structure 30A is viewed in a direction radially of the combustion liner 2. This cooling structure is formed in a major portion of an outer peripheral surface 2c (outer surface of the peripheral wall 2b) of the combustion liner 2 excluding a downstream end portion thereof with respect to the direction of flow of the compressed air A, that is, a major portion of the outer peripheral surface 2c ranging from the site of installation of the ignition plug 17 to an upstream end portion of the combustion liner 2 along the outer peripheral surface 2c. This heat transfer enhancement structure 30A is so designed as to effectively cool a portion of the outer peripheral surface 2c of the combustion liner 2 which corresponds to the second combustion zone S1 of the high temperature shown in and described with particular reference to FIG. 1.

Figure 3:
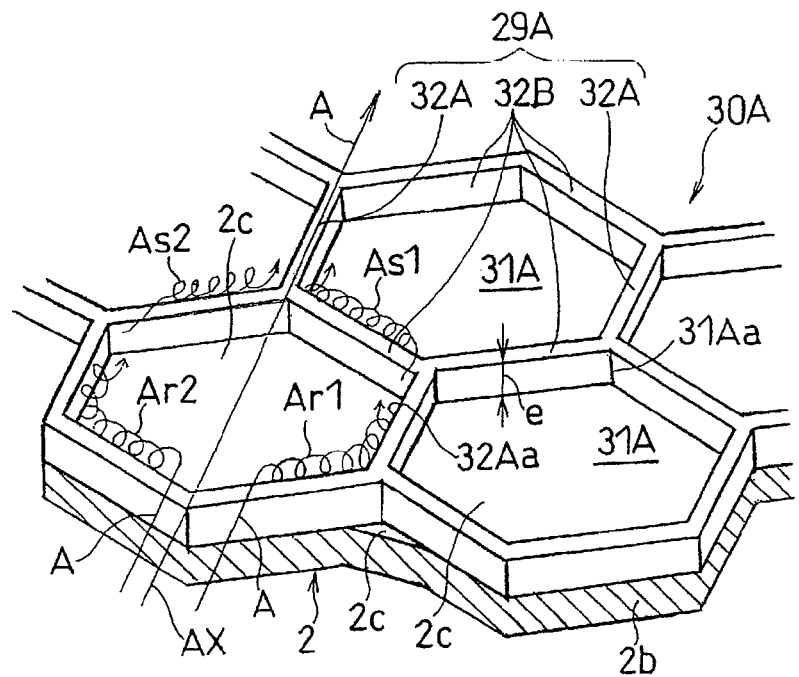
FIG. 3 is a schematic perspective view, on an enlarged scale, showing a heat transfer enhancement structure employed in the combustion liner shown in FIG. 2.

As shown in FIG. 3, the heat transfer enhancement structure 30A includes a multiplicity of equilateral hexagonal vertical walls 29A each made up of six ribs 32A and 32B, each protruding radially outwardly from the outer peripheral surface 2c of the combustion liner 2, and defining a corresponding equilateral hexagonal cell 31A. Those ribs 32A and 32B concurrently form the next adjoining equilateral hexagonal vertical walls 29A to thereby represent a pattern similar to any known honeycomb construction, in which a large number of the equilateral hexagonal cells 31A are arranged next to each other.

Figure 4:
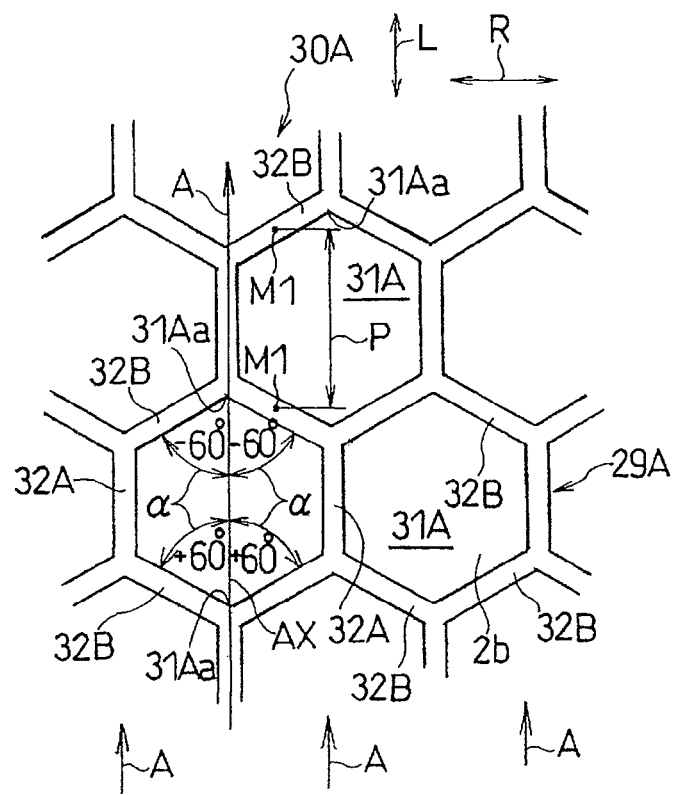
FIG. 4 is a schematic plan view, showing the heat transfer enhancement structure shown in FIG. 3.

As best shown in FIG. 4, the heat transfer enhancement structure 30A is so formed that at least two vertexes 31Aa, 31Aa opposed to each other, forming one vertex pair out of three vertex pairs of the equilateral hexagonal cell 31A are aligned with each other and also with the direction of flow of the compressed air A along the outside of the combustion liner 2. It is to be noted that the direction of flow of the compressed air A aligns with the longitudinal axis of the combustion liner 2. Thus, the heat transfer enhancement structure 30A is of such a design that four of the six sides of each of the hexagonal vertical walls 29A, that is, four of the six ribs defining the respective cell 31A, that is, the four ribs identified by 32B (which are hereinafter referred to as "slanted ribs") extend slantwise relative to the direction of flow of the compressed air A or the longitudinal axis of the combustion liner 2, while the remaining two ribs, that is, the ribs identified by 32A (which are hereinafter referred to as "ribs") extend in a longitudinal direction L parallel to the direction of flow of the compressed air A. The crossed axes angle α from the direction of flow of the compressed air A, that is, the angle of attack α to the direction of flow of the compressed air is so chosen as to be +60° in the case of each of two of the four slanted ribs 32B on an upstream side with respect to the direction of flow of the compressed air A and −60° in the case of each of the remaining two slanted ribs 32B on a downstream side with respect to the direction of flow of the compressed air A.

The function of the heat transfer enhancement structure 30A will now be described. As best shown in FIG. 3, the compressed air A flowing along the outer peripheral surface 2c of the combustion liner 2 is, when it flows over the slanted ribs 32B of the cells 31A on the upstream side with respect to the direction of the compressed air A, deflected slantwise by and along the slanted ribs 32B, accompanied by formation of swirling flows Ar1 and Ar2 of the compressed air A. By the action of those swirling flows Ar1 and Ar2 so formed, the compressed air A is stirred enough to reduce or disrupt the thermal boundary layer of the compressed air A to facilitate convection flow of the compressed air A. Accordingly, a portion of the compressed air, which is relatively low in temperature and is flowing at a location distant from the outer peripheral surface 2c of the combustion liner 2, is drawn towards the outer peripheral surface 2c of the combustion liner 2, whereby heat transfer takes place efficiently from the combustion liner 2 to the compressed air A to thereby increase a convection cooling effect on and of the combustion liner 2.

Assuming that an axis AX is drawn to extends across the two opposed vertexes 31Aa and 31Aa of the cell 31A, the swirling flow Ar1 on the right side of the axis AX flows in a direction away from the axis AX, while swirling leftwards with respect to the direction of flow thereof, and subsequently reaches the adjacent rib 32A and collides against an inner side face 32Aa of the respective rib 32A to thereby effectively cool the latter. Thereafter, the swirling flow Ar1 moves along the rib 32A with its swirl being somewhat weakened and then collides slantwise against the slanted ribs 32B of the respective cell 31A on the downstream side with respect to the direction of flow of the compressed air A, forming a reverse swirling flow As1, i.e., a swirling flow swirling rightwards to thereby flow in a direction close towards the axis AX. In this way, the directions of swirling of each of the swirling flows Ar1 and As1 changes alternately and, at the same time, respective directions of flow of the swirling flows Ar1 and As1 change alternately and, therefore, rather strong swirling flows Ar1 and As1 are generated. In a manner similar to those occurring on the left side of the axis AX as hereinabove described, a rightward swirling flow Ar2 and leftward swirling flow As2 are generated on the left side of the axis AX. Thus, by the action of the strong swirling flows Ar1, As1, Ar2 and As2, the combustion liner 2 can be cooled effectively and efficiently.

Also, since the heat transfer enhancement structure 30A is of the honeycomb construction, and since the ribs 32A and 32B of the heat transfer enhancement structure 30A exist continuously having been deployed in the longitudinal direction L along the direction of flow of the compressed air A on the outer peripheral surface 2c of the combustion liner 2 and also in a direction R transverse to the longitudinal direction L as shown in FIG. 4, the heat transfer enhancement structure 30A of the honeycomb construction functions as a stress member operable to reinforce the combustion liner 2 in its entirety to thereby increase the rigidity of the latter. For this reason, buckling of the combustion liner 2 is effectively prevented, which would otherwise occur under the influence of the thermal stress, brought about by the difference in temperature between the inside and outside of the combustion liner 2 and the difference in pressure between the inside and outside of the combustion liner 2.

When the heat transfer enhancement structure 30A of the type referred to above is so designed and so arranged that the slanted ribs 32B can be slanted at the cross axes angle α of ±60° with respect to the direction of flow of the compressed air A such as in the embodiment hereinabove described, the Nusselt's number can attain the largest value and, therefore, the heat transfer efficiency can be increased. This is demonstrated in "Augmented Heat transfer in rectangular channels of narrow aspect ratios with rid turbulators", Int. Heat Mass Transfer. Vol. 32, No. 9, pp. 1619-1630, 1989, with reference to FIG. 9. Accordingly, when each of the cells 31A of the heat transfer enhancement structure 30A is formed in an equilateral hexagonal shape, all of the four slanted ribs 32B are arranged at the cross axes angle of ±60° relative to the direction of flow of the compressed air A and, accordingly, the most feasible heat transfer enhancement structure 30A of the honeycomb construction can be obtained. It is to be noted that by rotating the equilateral hexagonal shape, the ribs 32A and 32A parallel to each other in the equilateral hexagonal shape may be so arranged as to lie perpendicular to the direction of flow of the compressed air A. Also, the shape of each of the cells 31A may not be always limited to the equilateral hexagonal shape, but may be other polygonal shape such as a triangle, square or generally elongated hexagonal shape. In that case the cross axes angle α of the slanted ribs with respect to the direction of flow of the compressed air A is so chosen as to be within the range of 40 to 80°, preferably within the range of 50 to 70°, more preferably within the range of 55 to 65°, and most preferably 60°.

Figure 5:
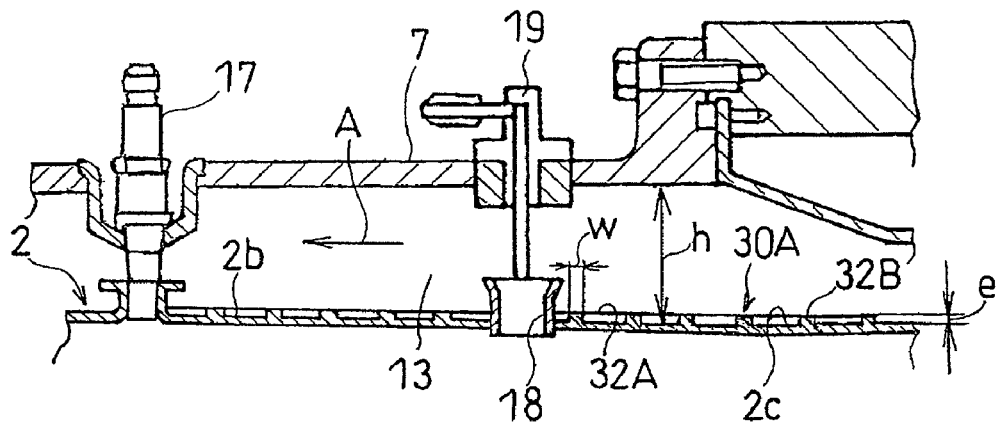
FIG. 5 is a fragmentary longitudinal sectional view, on an enlarged scale, showing a portion of the gas turbine combustor shown in FIG. 1.

Also, in order to increase efficiency of the heat transfer brought about by the compressed air A, as shown in FIG. 5, the ratio e/h between the height e of each of the ribs 32A and 32B and the distance h between the outer peripheral surface 2c of the combustion liner 2 and the inner peripheral surface of the casing 7 is so chosen as to be preferably within the range of 0.02 to 0.08. Specifically, when the ratio e/h is chosen to be within the range of 0.02 to 0.04, the height of each of the ribs is so low that such an advantage can be appreciated that reduction of the cost of manufacturing of the combustion liner can be achieved; when the ratio e/h is chosen to be within the range of 0.06 to 0.08, the height of each of the ribs is so large that such an advantage can be appreciated that increase of the rigidity of the combustion liner can be achieved; and when the ratio e/h is chosen to be within the range of 0.04 to 0.06, such an advantage can be appreciated that both of the reduction in manufacturing cost of the combustion liner and the increase of the rigidity of the combustion liner can be concurrently accomplished. It is to be noted that in the foregoing description of the embodiment, the ratio e/h is set to 0.07. In this case, each of the ribs 32A and 32B has a width W that is equal to the height e. More specifically, the height e of each of the ribs 32A and 32B was set to 1.5 mm and the distance h is set to 20 mm.

In order to effectively generate a swirling flow having a high heat transfer efficiency in the compressed air A, it is necessary to properly set the height e and a pitch P of arrangement of the slanted ribs 32B, shown in FIG. 4, in the longitudinal direction L parallel to the direction of flow of the compressed air A. Considering that the pitch P of arrangement of the slanted ribs 32B is expressed by the distance between intermediate points M1 and M1 in the direction lengthwise of the slanted ribs 32B as measured in the longitudinal direction L. By way of example, if the pitch P of arrangement is small and the height e of each of the slanted ribs 32B are so set as to be large, the compressed air A exfoliated from the outer peripheral surface 2c of the combustion liner 2 will hardly adheres again to the outer peripheral surface 2c and, therefore, the convection cooling efficiency of the combustion liner 2 will be lowered. When the ratio P/e between the pitch P of arrangement and the height e of each of the slanted ribs 32B is so chosen as to be within the range of 6 to 14, the compressed air A will again contact the outer peripheral surface 2c of the combustion liner 2 after the compressed air A once exfoliated from the outer peripheral surface 2c of the combustion liner 2 is formed as the swirling flows Ar1 and Ar2, but before they reach the slanted ribs 32B on the downstream side, thus enabling the compressed air A to be effectively cooled. (See paragraph [0014] of the Patent Document 1.) In the meantime, the ratio P/e is preferably within the range of 7 to 10.

Figure 11:
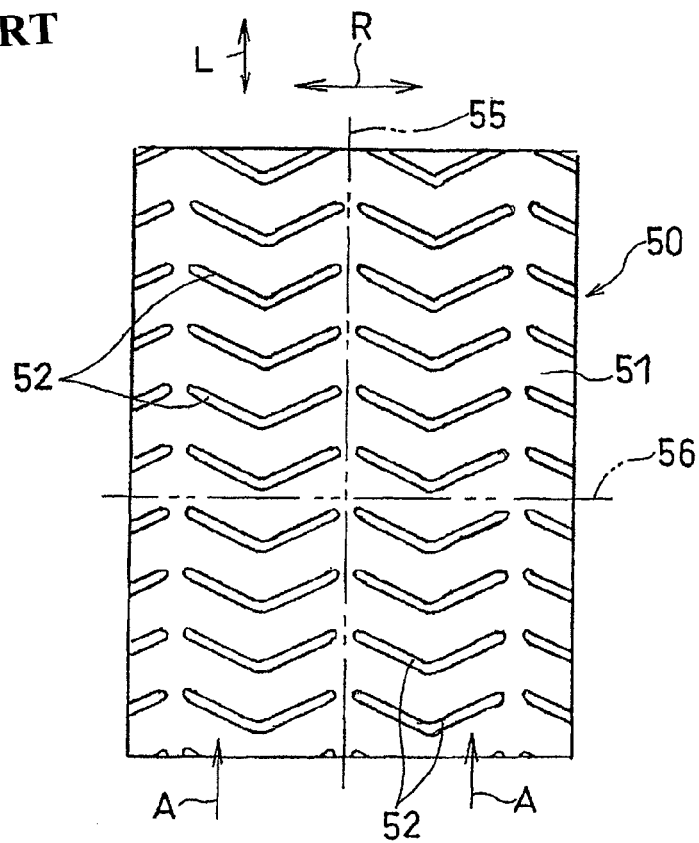
FIG. 11 is a schematic plan view, showing one example of the heat transfer member in the combustion liner employed in the conventional gas turbine combustor, as viewed from the radial direction of the combustion liner.
Figure 12:
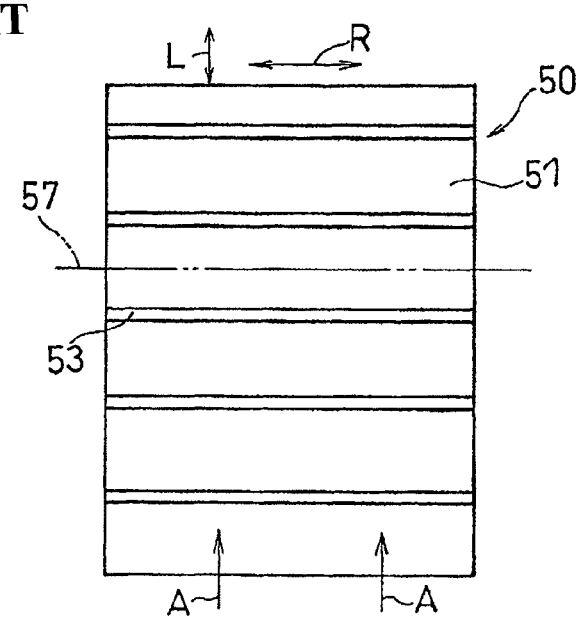
FIG. 12 is a schematic plan view, showing another example of the heat transfer member in the combustion liner employed in the conventional gas turbine combustor, as viewed from the radial direction of the combustion liner.

In order to ascertain the convection cooling effect exhibited by the heat transfer enhancement structure 30A of the structure so set as hereinabove described, an experiment was conducted to determine the temperatures of outer and inner surfaces of a flat plate provided with the heat transfer enhancement structure according to the embodiment of the present invention described hereinabove, and of a smooth flat plate as a comparative example. During the experiments, under the same condition, a high temperature gas was flowed along the inner surface of each of those flat plates while a low temperature air was flowed along the outer surface of each of those flat plates. As a result, the flat plate equipped with the heat transfer enhancement structure 30A (α=60°, e=1.5 mm, h=20 mm and P=12 mm) has exhibited 128° C. temperature reduction in the outer surface thereof and 108° C. temperature reduction in the inner surface, as compared with the smooth flat plate having no heat transfer enhancement structure. On the other hand, as compared with a flat plate of a design, in which heat transfer enhancement ribs 53 extending in a direction perpendicular to the direction of flow of the compressed air A as shown by the double dotted chain line in FIG. 11, which ribs are formed on an outer surface of the flat plate and have the same height as those in the heat transfer enhancement structure 30A, were arranged at the same pitch as those in the heat transfer enhancement structure 30A, 41° C. temperature reduction and 36° C. temperature reduction were found in the outer and inner surfaces, respectively. Thus, it has been ascertained that the heat transfer enhancement structure 30A is effective to cool the combustion liner 2.

The combustion liner 2 having the heat transfer enhancement structure of the honeycomb construction on the outer peripheral surface 2c thereof as best shown in FIG. 2 can be fabricated by the use of any known processes, for example, chemical milling, mechanical machining, casting, brazing and/or welding. Specifically, where the chemical milling is to be employed, the heat transfer enhancement structure 30A of the honeycomb construction can be formed on the outer peripheral surface 2c of the combustion liner 2 by masking respective portions of the combustion liner 2, where the ribs 32A and 32B are to be formed, after a combustion liner 2 of a predetermined thickness, which is the sum of the required thickness of the combustion liner 2 plus the height of each of the ribs 32A and 32B, with the use of a heat resistant nickel alloy such as, for example, Hastelloy-X (a registered trademark owned by Haynes International. Inc.), HA-230 (also a registered trademark owned by Haynes International. Inc.) or In617 (a registered trademark owned by International Nickel Company. Inc.) or a heat resistant cobalt alloy such as, for example, HA-188 (a registered trademark owned by Haynes International. Inc.) as a material for the combustion liner 2. Fabrication with the use of the chemical milling described above involves small residue stress that can be negligible as compared with that by the mechanical machining and, therefore, the resultant combustion liner 2 is robust against buckling.

Figure 6:
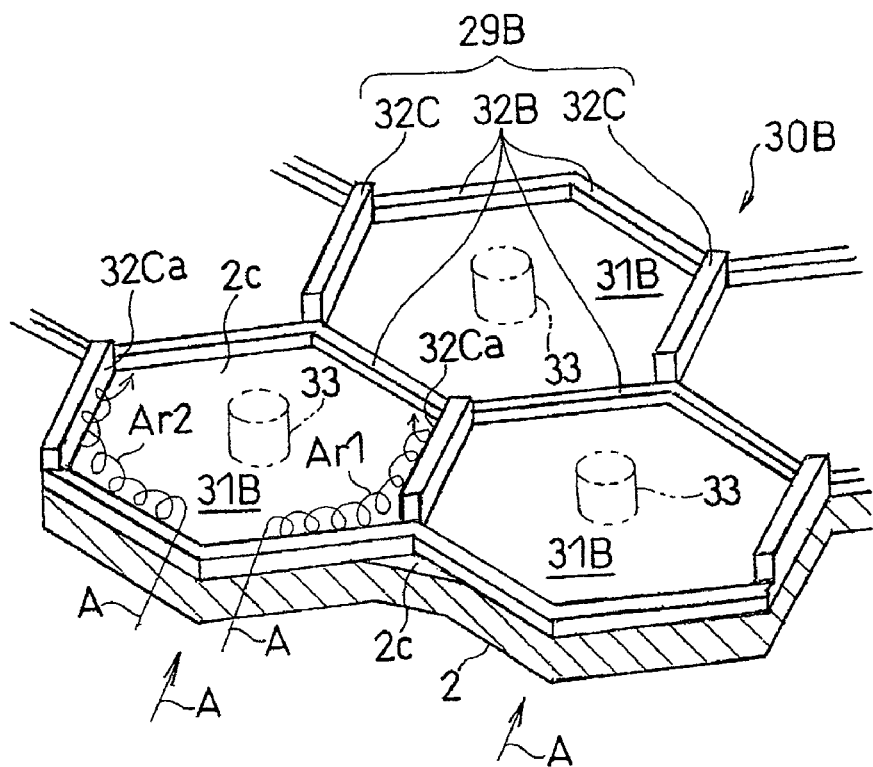
FIG. 6 is a schematic perspective view, showing a portion of the heat transfer enhancement structure employed in the gas turbine combustor according to a second embodiment of the present invention.

FIG. 6 illustrates a schematic perspective view of a portion of a heat transfer enhancement structure 30B formed on the combustion liner 2 of the gas turbine combustor according to a second embodiment of the present invention. The heat transfer enhancement structure 30B is substantially similar to the heat transfer enhancement structure 30A according to the previously described embodiment as far as the vertical walls 29B of the equilateral hexagonal shape are arranged next to each other, but differs from the heat transfer enhancement structure 30A in that two ribs 32C of the six ribs depicting the equilateral hexagonal shape, which are opposed to each other and extends parallel to the direction of flow of the compressed air A are so formed as to protrude beyond the remaining, slanted ribs 32B in a direction away from the peripheral surface 2c of the combustion liner 2, that is, as to have a height larger than that of each of the slanted ribs 32B.

With the heat transfer enhancement structure 30B of the structure described above and with reference to FIG. 6, not only can effects similar to those afforded by the heat transfer enhancement structure 30A according to the first embodiment be obtained, but the swirling flows Ar1 and Ar2 of the compressed air A generated by the slanted ribs 32B on the upstream side with respect to the direction of the compressed air A relative to the ribs 32C flow in contact with inner side faces 32Ca of those ribs 32C, which have a large heat transfer area because of the large height, and cooling of the ribs 32C is therefore enhanced to further increase the convection cooling effect of the combustion liner 2. Also, since the presence of the high ribs 32C allows the combustion liner 2 to have an increased rigidity and, therefore, a possible occurrence of buckling can be further effectively suppressed. Where this heat transfer enhancement structure 30B is to be fabricated by the use of the previously described chemical milling, the higher ribs 32C and the slanted ribs 32B must be formed separately and, therefore, the masking has to be carried out two times.

Figure 7:
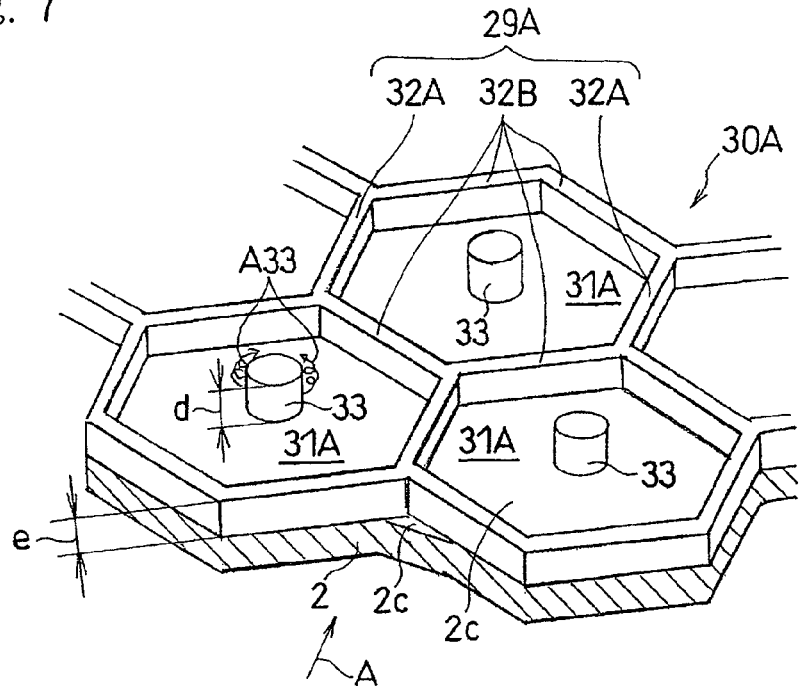
FIG. 7 is a view similar to FIG. 6, showing that portion of the heat transfer enhancement structure employed in the gas turbine combustor according to a third embodiment of the present invention.

FIG. 7 illustrates a schematic perspective view of a portion of the gas turbine combustor according to a third embodiment of the present invention. In this embodiment, the outer peripheral surface 2c of the combustion liner 2 is provided not only with the heat transfer enhancement structure 30A of the structure substantially similar to that described in connection with the first embodiment, but also provided with cylindrical stand-alone ribs 33, which is positioned at a center portion of the respective equilateral hexagonal cell 31A so as to protrude radially outwardly from a portion of the outer peripheral surface 2c of the combustion liner 2, and has a height d identical with the height of any of the ribs 32A and 32B. The stand-alone rib is separated from and independent of any of the ribs 32A and 32B forming the honeycomb construction.

According to this embodiment, considering that the use is made of the heat transfer enhancement structure in a manner similar to that in the previously described first embodiment, effects similar to those afforded by the heat transfer enhancement structure employed in the first embodiment can be obtained. Further, while according to the first embodiment the swirling flows of the compressed air A do hardly reach that center portion of each of the equilateral hexagonal cell 31A, the combustion liner 2 can be advantageously uniformly cooled locally because the compressed air A generates eddies A33 of the compressed air A at a location rearwardly of each of the stand-alone ribs 33 within that center portion of the respective equilateral hexagonal cell 31A so that the compressed air can be stirred by the effect of those eddies 33A. Also, since the stand-alone ribs have the height d equal to the height e of the ribs 32A and 32B, during the fabrication using the chemical milling the masking can be performed only one time in forming the heat transfer enhancement structure 30A and the stand-alone ribs 33 simultaneously. It is, however, to be noted that by performing the masking two times, the stand-alone ribs 33 having a height d different from the height e of the ribs 32A and 32B can be formed. It is also to be noted that even in the second embodiment shown in and described with particular reference to FIG. 6, stand-alone ribs similar to the stand-alone ribs 33 described hereinabove can be employed at the respective center portions of the equilateral hexagonal cells 31B, employed in the heat transfer enhancement structure 30B.

Figure 8:
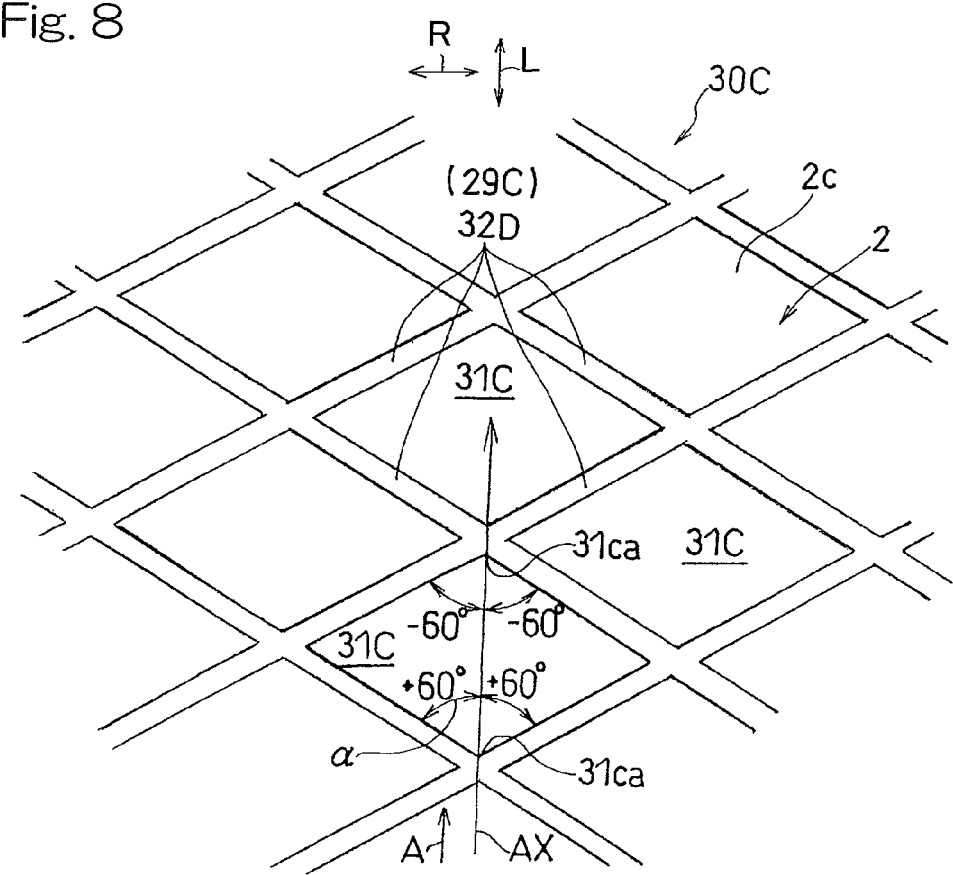
FIG. 8 is a schematic plan view, on a further enlarged scale, showing that portion of the heat transfer enhancement structure in the gas turbine combustor according to a fourth embodiment of the present invention as viewed from a radial direction of the combustion liner.

FIG. 8 illustrates a schematic side view of that portion of the heat transfer enhancement structure, now identified by 30C, which is formed on the outer peripheral surface 2c of the combustion liner 2 in the gas turbine combustor according to a fourth embodiment of the present invention, as viewed from a radial direction of the combustion liner 2. The heat transfer enhancement structure 30C is of a honeycomb construction including a multiplicity of rhombic cells 31C, each arranged next to each other and bound by a corresponding vertical wall 29C. In the heat transfer enhancement structure 30C, at least two vertexes opposed each other, forming one vertex pair out of two vertex pairs of the square shape, are opposed to each other on the outer peripheral surface 2c of the combustion liner 2 in a direction parallel to the direction of flow of the compressed air A. As a matter of course, each of the four ribs 32D forms slanted relative to the direction of flow of the compressed air A. Also, those four slanted ribs 32D are held at a slant angle $\alpha$ of +60° or −60° relative to the direction of flow of the compressed air A.

Even in this embodiment described above, since all of the four ribs 32D of each of the heat transfer enhancement structure 30C cross over the direction of flow of the compressed air A, swirling flows of the compressed air A can be generated by the effect of all of those ribs 32D to such an extent as to permit the compressed air A to be sufficiently stirred and, therefore, the combustion liner 2 can be effectively and efficiently cooled.

Figure 9A:
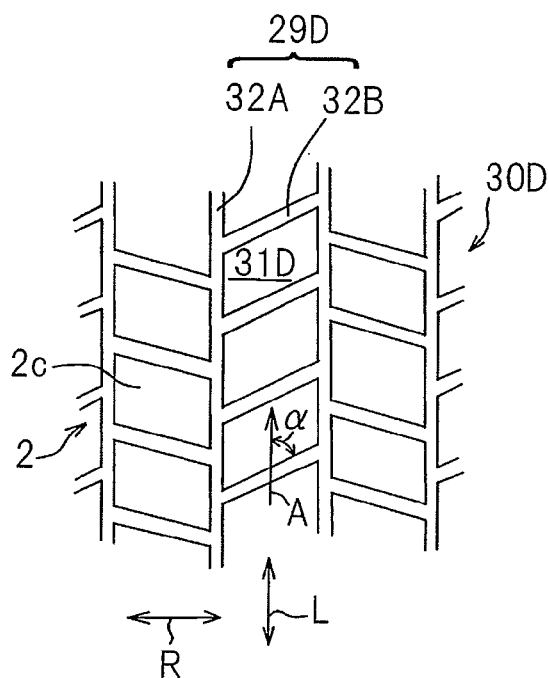
FIG. 9A is schematic plan view, showing that portion of the heat transfer enhancement structure in the gas turbine, employed in a fifth embodiment of the present invention, as viewed from the radial direction of the combustion liner.
Figure 9B:
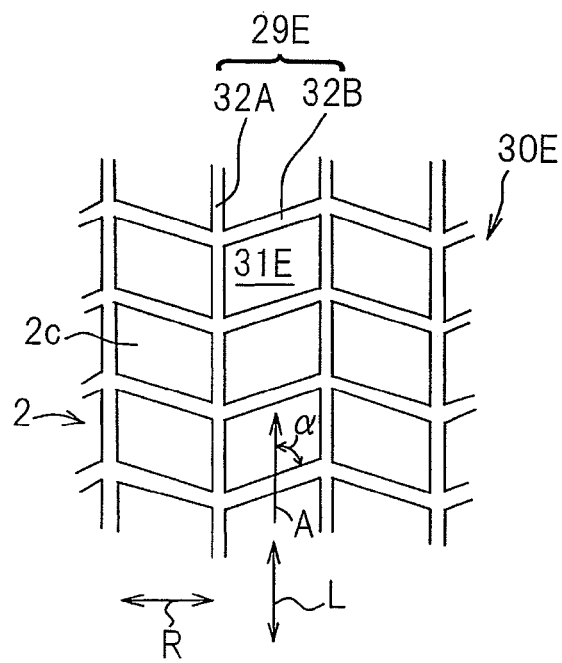
FIG. 9B is schematic plan view, showing that portion of the heat transfer enhancement structure in the gas turbine, employed in a sixth embodiment of the present invention, as viewed from the radial direction of the combustion liner.

The honeycomb construction that can be employed in the practice of the present invention may be of a parallelogrammic configuration designed according to a fifth embodiment shown in FIG. 9A or of a parallelogrammic configuration designed according to a sixth embodiment shown in FIG. 9B. More specifically, in the fifth embodiment shown in FIG. 9A, the heat transfer enhancement structure, now identified by 30D, is of a honeycomb construction in which substantially quadrilateral cells 31D, each bound by a respective vertical wall 29D, are deployed next to each other. Two of the four sides of the quadrilateral shape, which are opposed to each other, are occupied respectively by the ribs 32A lying parallel to the direction of flow of the compressed air A while the remaining two sides thereof, which are similarly opposed to each other, are occupied respectively by the ribs 32B lying at a crossing angle $\alpha$ of not larger than 90° relative to the direction of flow of the compressed air A. The cells 31D are of such an arrangement that some of those cells 31D, which are neighboring with each other in the longitudinal direction L, are continuously deployed side by side in the transverse direction R, having occupied the same positions. The cells 31D neighboring with each other in the transverse direction R are inclined in a direction reverse to the direction of flow of the compressed air A and are displaced a ½ pitch in a direction along the axial direction of the combustion liner 2 (in this instance, coinciding with the longitudinal direction L parallel to the direction of flow of the compressed air A). In the sixth embodiment shown in FIG. 9B, the heat transfer enhancement structure, now identified by 30E, is of a honeycomb construction which employs substantially quadrilateral cells 31E, each bound by a respective vertical wall 29E, in a manner similar to that employed in the fifth embodiment shown in FIG. 9A, but differs from that according to the fifth embodiment in that some of those quadrilateral cells 31E, which are neighboring with each other in the longitudinal direction L, are continuously deployed side by side in a transverse direction R perpendicular to the longitudinal direction L, having occupied the same positions and in that the arrangement pitch of the cells 31E neighboring with each other in the transverse direction R are not displaced in the longitudinal direction L.

Figure 9C:
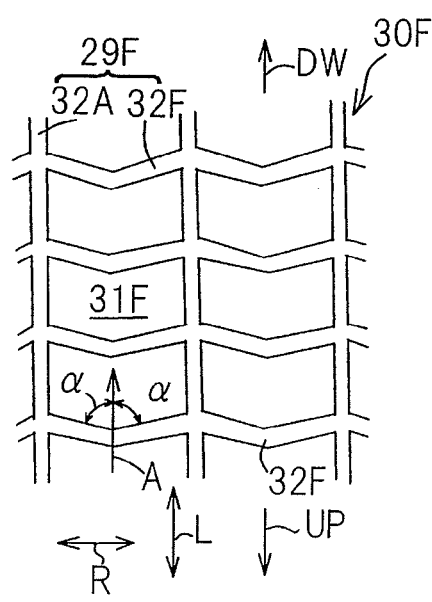
FIG. 9C is schematic plan view, showing that portion of the heat transfer enhancement structure in the gas turbine, employed in a seventh embodiment of the present invention, as viewed from the radial direction of the combustion liner.

In a seventh embodiment shown in FIG. 9C, the heat transfer enhancement structure, now identified by 30F, is of a honeycomb construction in which the cells 31F, each bound by the respective vertical wall 29F and representing a generally bent rectangular shape, are continuously deployed in the longitudinal direction L parallel to the direction of flow of the compressed air A and also in a transverse direction R perpendicular to the longitudinal direction L. Two of the four sides of the rectangular shape, which are opposed to each other in the transverse direction R, are defined respectively by the ribs 32A extending along the direction of flow of the compressed air A while the remaining two sides thereof, which are opposed to each other in the longitudinal direction L, are defined respectively by generally V-shaped ribs 32F so bent in the same direction as to protrude towards an upstream side UP of the flow of the compressed air A. The cross axes angle $\alpha$ of each of the V-shaped ribs 32F relative to the direction of flow of the compressed air A is not larger than 90° after all. Even in any one of the fifth to seventh embodiments hereinabove described with particular reference to FIGS. 9A to 9C, the slanted ribs 32B or the V-shaped ribs 32F cross the direction of flow of the compressed air A at a crossing angle of not larger than 90° so that the swirling flows can be generated, and, therefore, the convection cooling effect increases.

Figure 9D:
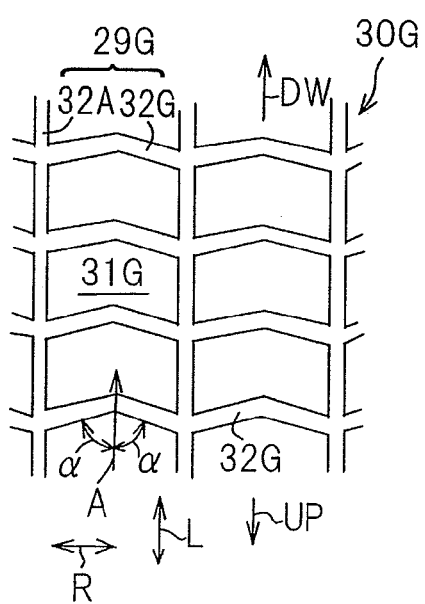
FIG. 9D is schematic plan view, showing that portion of the heat transfer enhancement structure in the gas turbine, employed in an eighth embodiment of the present invention, as viewed from the radial direction of the combustion liner.

FIG. 9D illustrates the heat transfer enhancement structure 30G according to an eighth embodiment. According to this embodiment, the heat transfer enhancement structure 30G includes a multiplicity of cells 31G each bound by a respective vertical wall 29G and representing a shape similar to the shape of each rectangular cell 31F, which is employed in the seventh embodiment but which is reversed upside down in a direction parallel to the longitudinal direction L. Also, in this eighth embodiment, two of the four sides each of the cells 31G, which are opposed to each other in the longitudinal direction L, are defined respectively by generally V-shaped ribs 32G so bent in the same direction at an intermediate point in the transverse direction R as to protrude towards a downstream side DW of the flow of the compressed air A.

Figure 10:
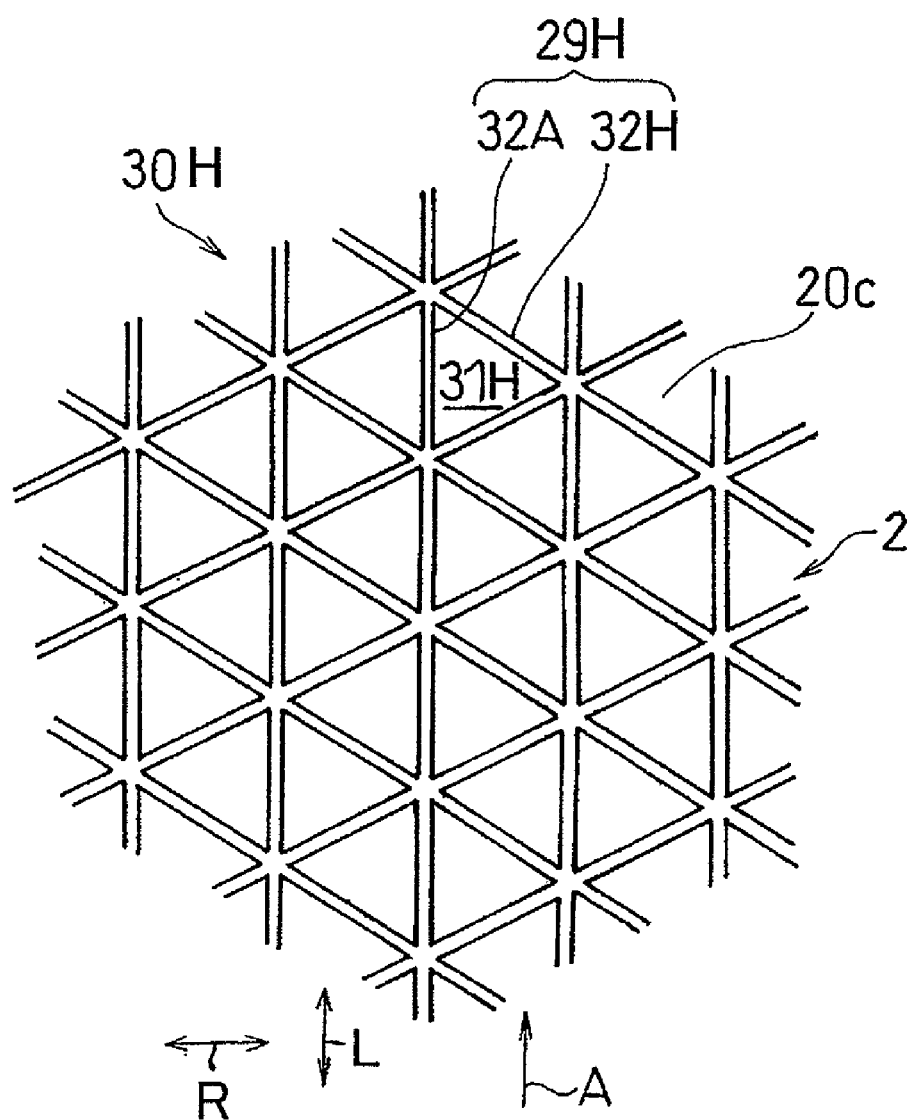
FIG. 10 is a schematic plan view, on an enlarged scale, showing that portion of the heat transfer enhancement structure, employed in the gas turbine combustor according to a ninth embodiment of the present invention, as viewed from the radial direction of the combustion liner.

FIG. 10 illustrates the heat transfer enhancement structure 30H provided on that portion of the outer peripheral surface 2c of the combustion liner 2 according to a ninth embodiment of the present invention, as viewed from the radial direction of the combustion liner 2. The heat transfer enhancement structure 30H is of a honeycomb construction in which a multiplicity of equilateral triangular cells 31H each bound by a respective vertical wall 29H are deployed next to each other. In this heat transfer enhancement structure 30H, one of the three sides of the triangular shape is defined by an rib 32A extending in a direction parallel to the longitudinal direction L, which is in turn parallel to the direction of flow of the compressed air A, while the remaining two sides of the triangular shape are defined by respective slanted ribs 32B. It is to be noted that in the practice of the ninth embodiment, each of the cells 31H may have any other triangular shape than the equilateral triangular shape. In any event, however, at least one of the three sides of the triangular shape crosses the direction of flow of the compressed air A at a crossing angle not larger than 90° so that at least one side can generate a swirling flow enough to increase the convection cooling effect.

It is also to be noted that in any one of the fourth to ninth embodiments shown in and described with reference to FIGS. 8 to 10, respectively, a pin similar to that shown in and described with particular reference to FIG. 7 may be provided at the center of each of the cells 31C to 31H. It is further to be noted that in any one of the fifth to tenth embodiment of the present invention shown in and described with reference to FIGS. 9A to 9D and 10, respectively, the parallel ribs 32A may be of a design having a larger amount of protrusion than that of any one of the slanted ribs in a manner substantially as shown in FIG. 6.

By way of example, in each of the various embodiments of the present invention described hereinbefore, the direction of flow of the compressed air A may be somewhat inclined relative to the longitudinal direction of the combustion liner 2, in which case the longitudinal direction L parallel to the direction of flow of the compressed air A and the transverse direction R perpendicular to the direction of flow of the compressed air A do not coincide with the longitudinal and circumferential directions of the combustion liner 2, respectively.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A gas turbine combustor comprising:
    a combustion liner having a combustion chamber defined therein and an outer peripheral surface forming a path of a compressed air; and
    a heat transfer enhancement structure provided on the outer peripheral surface of the combustion liner and having a honeycomb construction defined by ribs protruding outwardly from the outer peripheral surface of the combustion liner,
    wherein the honeycomb construction has a slanted rib arranged at a slanted cross angle relative to a direction of flow of the compressed air and a parallel rib extending parallel to the direction of flow of the compressed air, and
    wherein the parallel rib protrudes a larger distance than that of the slanted rib.

2. The gas turbine combustor as claimed in claim 1, wherein the honeycomb construction is of a geometry having an array of hexagonal shapes arranged next to each other.

3. The gas turbine combustor as claimed in claim 2, wherein at least two vertexes opposed each other, forming one vertex pair out of three vertex pairs of the hexagonal shape, are opposed to each other in a direction along a direction of flow of the compressed air.

4. The gas turbine combustor as claimed in claim 3, wherein the honeycomb construction has two of the parallel ribs, which forms two sides opposed to each other.

5. The gas turbine combustor as claimed in claim 1, wherein the honeycomb construction is of a geometry having an array of rhombic shapes arranged next to each other.

6. The gas turbine combustor as claimed in claim 5, wherein at least two vertexes opposed each other, forming one vertex pair out of two vertex pairs of the rhombic shape, are opposed to each other in a direction along a direction of flow of the compressed air.

7. The gas turbine combustor as claimed in claim 1, wherein the honeycomb construction is of a geometry having an array of triangle shapes arranged next to each other.

8. The gas turbine combustor as claimed in claim 1, wherein the honeycomb construction is of a geometry having an array of parallelogrammic shapes arranged next to each other, each shape having two sides opposed to each other and extending parallel to a direction of flow of the compressed air.

9. The gas turbine combustor as claimed in claim 1, wherein the honeycomb construction is of a geometry having an array of bent rectangular shapes arranged next to each other, each shape having two sides opposed to each other and extending parallel to a direction of flow of the compressed air and the remaining two opposed sides so bent as to protrude towards an upstream side or a downstream side of the direction of flow of the compressed air.

10. The gas turbine combustor as claimed in claim 1, further comprising a stand-alone rib provided at a center of each of cells defining the honeycomb construction and separate from each of sides of the honeycomb construction.

* * * * *